April 20, 1965 F. E. BROOKS 3,179,842

VERTICAL DEFLECTION CIRCUIT FOR TELEVISION RECEIVERS

Filed Jan. 24, 1962 2 Sheets-Sheet 1

INVENTOR.
FORREST E. BROOKS
BY
W. H. Sprouagle
Attorney

VERTICAL DEFLECTION CIRCUIT FOR TELEVISION RECEIVERS

Filed Jan. 24, 1962 2 Sheets-Sheet 2

INVENTOR.
FORREST E. BROOKS
BY
W. H. Sprague
Attorney

United States Patent Office
3,179,842
Patented Apr. 20, 1965

3,179,842
VERTICAL DEFLECTION CIRCUIT FOR TELEVISION RECEIVERS

Forrest E. Brooks, Moorestown, N.J., assignor to Radio Corporation of America, a corporation of Delaware Filed Jan. 24, 1962, Ser. No. 168,345
4 Claims. (Cl. 315—27)

Figure 1:
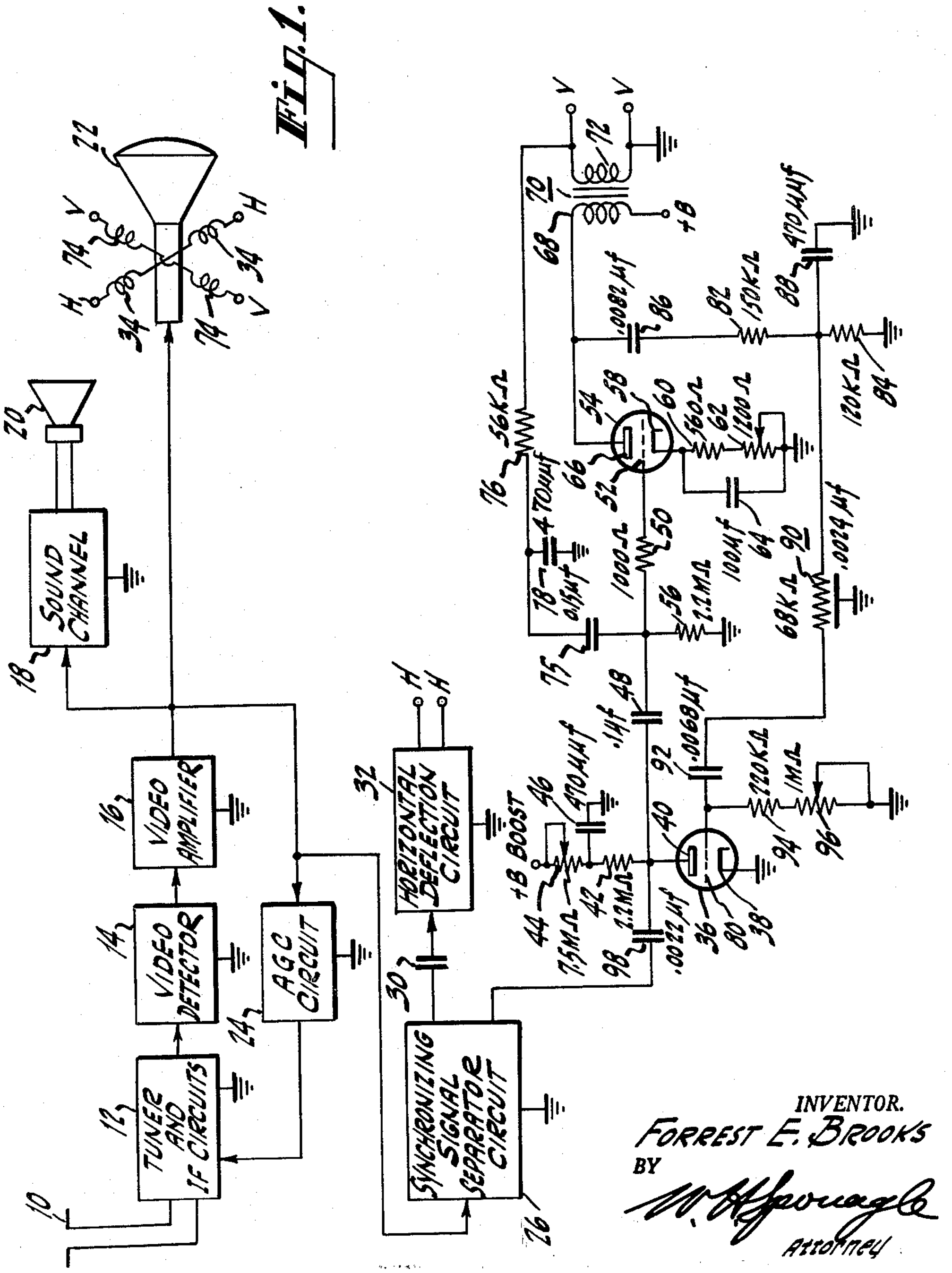

This invention relates to television receiver circuits, and more particularly to vertical deflection circuits for generating a deflecting signal to apply to the vertical deflecting device of a kinescope, or cathode ray tube image reproducing device, of a television receiver.

In order to reproduce an image on the screen of a cathode ray tube in a television receiver, the electron beam of the tube is caused to scan a raster on the screen of the tube so that light is emitted from the screen in a series of vertically-spaced, horizontal lines. In the scanning process, the electron beam is deflected both vertically and horizontally from its normal position. As is known, present day cathode ray tubes for use in commercial television receivers generally are designed and built to utilize electromagnetic deflection of the electron beam. The electromagnetic deflecting field is provided by a deflection yoke which includes both horizontal and vertical deflection windings through which the proper currents are driven to provide the desired time varying deflecting field.

In order to drive the vertical windings of a deflection yoke, many commercial television receivers utilize a self-oscillating vertical deflection circuit, having two electron tubes, which may be in a single envelope, in which the self-oscillations may be synchronized by the vertical deflection synchronizing signals contained in a television video signal. The vertical deflection circuit includes an amplifier electron tube which is capable of supplying sufficient power to drive the vertical windings of the yoke, and a discharge electron tube which is used to control the conduction of the output tube.

With the advent of cathode ray image reproducing tubes that require wide angle deflection and the use of vertical electron magnetic yoke winding having an inductance-to-resistance ratio larger than has previously been used, it is becoming increasingly difficult to provide relatively inexpensive vertical deflection for a television receiver. Particularly, since the newer vertical yoke windings, such as toroidal vertical yokes, may be more inductive than those previously used, it is difficult to provide the required linearity and short retrace interval without the use of excessively large voltage pulses appearing on the electron tubes utilized in the circuit.

Briefly, in accordance with the invention, a vertical deflection circuit comprises a vertical amplifier or output tube and a vertical discharge tube, with feedback between the output tube and the discharge tube to provide self-oscillations in the circuit. A charging circuit is connected to supply substantially sawtooth driving signals to the output tube. The output signal of the output tube is supplied to the vertical deflection windings of an electromagnetic deflection yoke through a transformer. Feedback is provided from the secondary of the transformer to the input of the output tube to improve the linearity of the deflection and speed of retrace without requiring unusually large voltage pulses across the output tube.

Figure 2:
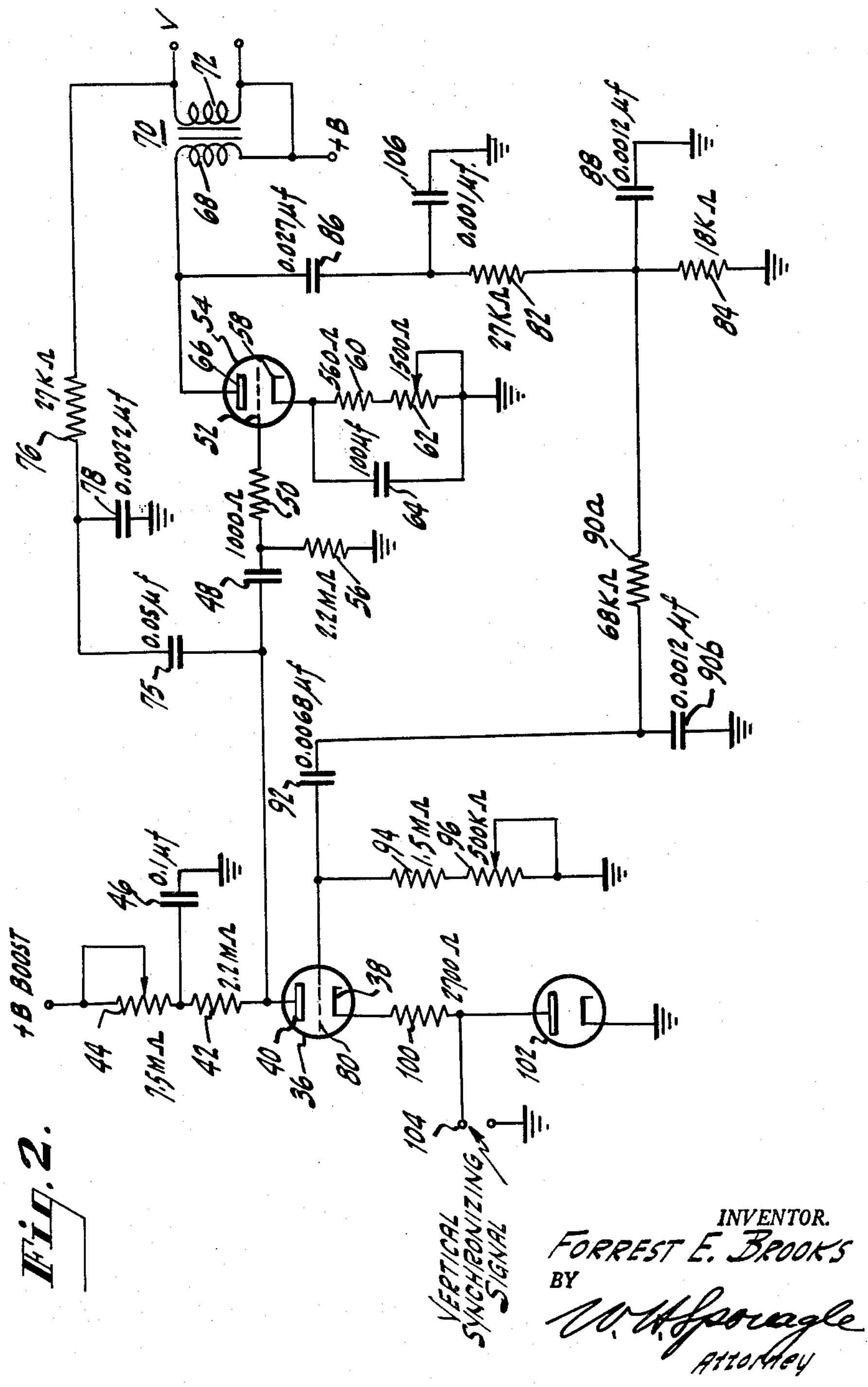

The invention may be better understood when the following detailed description is read in connection with the accompanying drawing, in which:

FIGURE 1 is a schematic circuit diagram, partly in block form, of a television receiver utilizing a vertical deflection circuit in accordance with the invention; and FIGURE 2 is a schematic circuit diagram of another embodiment of the invention.

FIGURE 1 shows a television receiver, which includes an antenna 10 for intercepting and supplying a radio frequency television wave to the tuner and IF circuits 12 of the receiver. The radio frequency television wave has a picture carrier amplitude modulated with the video image signals and horizontal and vertical synchronizing signals, and a sound carrier (spaced 4.5 mcs. in frequency from the picture carrier according to present day standards) frequency modulated with sound signals. An amplified intermediate frequency version of the radio frequency wave is available at the output of the tuner and IF circuits 12 and is applied to a video detector 14, where the amplitude modulation of the IF wave is detected to provide a video signal containing image signals and horizontal and vertical synchronizing signals. Also, the picture and sound IF carriers may be heterodyned in the video detector 14 to provide a 4.5 mc. intercarrier sound signal which is frequency modulated with the sound signals. The detected video signals and the intercarrier sound signal are applied to a video amplifier 16. The intercarrier sound signal is applied from the video amplifier 16 to a sound channel 18 where it is demodulated and applied to a loudspeaker 20 to reproduce the sound information.

The video signals are applied from the video amplifier 16 to a kinescope 22 or cathode ray tube, to modulate the intensity of the electron beam of the tube with the image component of the video signals. The video signals are also applied to an AGC (automatic gain control) circuit 24, which generates a control voltage from the video signals to control the gain of prior amplifiers in the receiver, such as the radio frequency and intermediate frequency amplifiers, to maintain the amplitude changes of the detected video signals within a small range despite any large changes in the amplitude of the received radio frequency wave.

The video signals are also applied to a synchronizing signal separator circuit 26, to separate the horizontal and vertical synchronizing pulses from the video signals. The video detector 14 is designed to deliver negative going video signals, that is, the peaks of the video signals (horizontal and vertical synchronizing pulses) are more negative than the image portions of the video signals. The polarity of the detected video signals is reversed through the video amplifier 16 and positive going video signals are thus applied to the synchronizing signal separator circuit 26. The polarity of synchronizing pulses is negative at the output of the synchronizing signal separator circuit 26.

The horizontal synchronizing pulses at the output of the synchronizing separator circuit 26 are applied through a coupling capacitor 30 to a horizontal deflection circuit 32 (which may be of any known design) for the receiver, and its output, available at its output terminals H—H, is applied to the terminals H—H of a set of horizontal deflection windings 34 positioned on the kinescope 22 in the usual manner to deflect the electron beam in the horizontal direction.

The vertical deflection circuit of the receiver embodying the invention comprises a triode electron tube as a discharge tube 36 having its cathode 38 connected to ground, or reference potential for the receiver. The anode 40 of the discharge tube 36 is connected to a relatively high value of direct operating voltage for the receiver, such as the known +B-boost circuit used in many present day television receivers, through a resistor 42 and a potentiometer 44, which serves as the vertical raster size control. The junction of the resistor 42 and the potentiometer 44 is by-passed to ground for signal frequencies at the horizontal deflection rate by a bypass capacitor 46. The anode 40 is also connected through a coupling capacitor 48 and parasitic oscillation suppression resistor 50 to the control grid 52 of an amplifier output tube 54. The control grid 52 of the output tube 54 is returned to ground through a grid resistor 56. Bias is provided for the output tube 54 by connecting its cathode 58 to ground through a cathode resistor 60 and a vertical linearity potentiometer 62, connected in series, and by-passed by a capacitor 64 of large capacitance value. The anode 66 of the output tube 54 is connected to a source of relatively low operating voltage for the receiver, +B, through the primary winding 68 of a vertical output transformer 70, whose secondary winding 72 is connected directly to a set of vertical deflection windings 74 positioned on the kinescope 22, as indicated by the terminals V—V on the windings 74 and the transformer secondary winding 72. One end of the secondary winding 72 is connected to ground or reference potential, for the receiver.

A charging capacitor 75 is connected in series with a peaking resistor 76 between the ungrounded end of the secondary winding 72 of the vertical output transformer 70 and the junction of the coupling capacitor 48 and a grid resistor 56. A by-pass capacitor 78 is connected between the junction of the charging capacitor 75 and the peaking resistor 76 and point of reference potential for the receiver to by-pass signals at the horizontal deflection frequency.

The vertical deflecting circuit is made self-oscillating by a feedback circuit connected between the anode 66 of the output tube 54 and the control grid 80 of the discharge tube 36. Specifically, a voltage divider, comprising a pair of serially connected resistors 82 and 84, is connected at one end to the anode 66 through a coupling capacitor 86 and is connected at the other end to ground for the receiver. The junction point of the resistors 82, 84 in the voltage divider is bypassed to ground for signal frequencies higher than the vertical deflection frequency by a bypass capacitor 88. The junction of the voltage divider resistors 82 and 84 is also connected to the control grid 80 of the discharge tube 36 through an integrating network 90 (which is a combined resistor and capacitor) and a storage capacitor 92. The function of the integrating network 90 is, as is known, to eliminate the feedback of any extraneous horizontal pulses to the discharge tube 36 which may prevent the vertical circuit from effecting line interlace in the proper manner. The control grid 80 is connected to ground through the series combination of a grid resistor 94 and a potentiometer 96. The potentiometer 96 serves as the vertical hold or vertical frequency control.

The circuit self-oscillates in the following manner: assume that the source of voltage +B-Boost is turned on. The charging capacitor 75 begins to charge through the potentiometer 44, the resistor 42, the coupling capacitor 48, the peaking resistor 76, and the secondary 72 of the transformer 70. The voltage at the junction of the capacitors 48 and 75 thus begins to rise in a positive direction. The rising positive voltage is applied to the control grid 52 of the output tube 54, and the current through the output tube 54, and thus through the primary winding 68 of the transformer 70, begins to increase. When the voltage on the grid 52 rises to a point more positive than the cathode 58 the current will cease to change through the output tube 54 and through the primary winding 68 and thus a positive pulse of voltage will be generated across the primary winding 68. A portion of this positive pulse of voltage is applied through the voltage divider resistors 82 and 84 and the storage capacitor 92 to the control grid 80 of the discharge tube 36. The discharge tube 36 thus begins to conduct heavily to discharge the charging capacitor 75. The pulse of voltage on the control grid 80, however, drives this grid highly positive with respect to the cathode 38, and a large negative voltage is built up on the grid side of the storage capacitor 92 which cuts off current flow through the discharge tube 36. The charging capacitor 75 then begins to charge again in the manner previously described. Additionally, the storage capacitor 92 begins to discharge through the grid resistor 94 of the discharge tube 36, the vertical hold potentiometer 96, the resistor in the integrating network 90, and the voltage divider resistor 84. When the negative voltage on the storage capacitor 92 is dissipated, the discharge tube 36 is in condition to conduct to again discharge the charging capacitor 75. This action abruptly reduces the current through the output tube 54 and again generates a positive pulse at the anode 66 which is applied through the feedback circuit in the manner previously described and the cycle repeats itself.

In order to synchronize the oscillations of the vertical deflection circuit with the video signal being processed by the receiver, a negative-going vertical synchronizing pulse from the synchronizing signal separator 26 is applied through a coupling capacitor 98 to the anode 40 of the discharge tube 36 and it is then further applied through the coupling capacitor 48 to the control grid 52 of the output tube 54. The current through the output tube 54 and the primary winding 68 is thus reduced, which generates a large positive pulse at the anode 66 of the tube 54. The positive pulse is applied in the manner previously described to the control grid 80 of the discharge tube 36 which causes the discharge tube 36 to conduct current heavily and eventually places a large negative charge on the grid side of the storage capacitor 92 to cut off current flow in the discharge tube 36. The charging capacitor 75 thus begins to charge again and the storage capacitor 92 begins to discharge. The cycle is repeated when the next vertical synchronizing pulse is applied.

It will be appreciated that the peaking resistor 76 in known vertical deflection circuits may be connected to signal ground for the receiver and that a larger peaking pulse (and consequently faster retrace time) may be obtained by increasing the resistance value of the peaking resistor 76. This, however, causes an excessively large voltage pulse to be developed on the anode 66 of the output tube 54, which may require the use of a more expensive output tube. Also, as more peaking from a peaking resistor is included in the circuit, less sawtooth wave is developed from the voltage charging source.

In accordance with the present invention, however, a negative going pulse of voltage is developed across the secondary winding 72 of the vertical output transformer 70 and is applied through the peaking resistor 76 and the charging capacitor 75 to the control grid 52 of the output tube 54. This supplies energy to the charging capacitor 75, reducing the amount of energy required to be supplied by the charging capacitor itself and thus reducing the amount of grid drive required for the output tube 54. The peaking thus applied from the transformer secondary winding 72 does not result in less sawtooth wave, consequently a particular sawtooth circuit is more effective and greater linearity control may be obtained, in addition to providing satisfactory retrace speed.

A practical vertical deflection circuit, constructed in accordance with the circuit shown in FIGURE 1 and using the component values shown on the drawing, provides a satisfactorily linear vertical deflection for a wide angle cathode ray image reproducing tube, with a retrace time on the order of 300 microseconds and an anode pulse on the output tube well within the maximum limitations of presently available vertical deflection tubes.

FIGURE 2 shows a vertical deflection circuit embodying the invention which is designed for the use of positive-going vertical synchronizing signals as opposed to the negative-going synchronizing signals utilized in FIGURE 1. In all major respects, the circuit shown in FIGURE 2 is substantially identical to that shown in FIGURE 1 and like reference numerals have been used to indicate corresponding elements of FIGURES 1 and 2.

The differences in circuit design are as follows:

(1) A cathode resistor 100 is connected in series with a diode 102 between the cathode 38 of the discharge tube 36 and ground for the receiver, the diode 102 being poled for conduction in the same direction as the discharge tube 36. Positive-going vertical synchronizing signals are applied at the terminal 104 across the diode 102;

(2) The charging capacitor 75 is connected at the junction of the anode 40 of the discharge tube 36 and the coupling capacitor 48, rather than to the junction of the coupling capacitor 48 and the oscillation suppression circuit 50 as shown in FIGURE 1;

(3) The end of the secondary winding 72 of the transformer 70, which was shown connected to ground in FIGURE 1, is connected to the source of low operating voltage, +B, in FIGURE 2;

(4) An additional by-pass capacitor 106, to bypass signals at the horizontal deflection frequency, is connected between ground and the junction of the coupling capacitor 86 and feedback resistor 82; and (5) The combined resistor-capacitor network 90 shown in FIGURE 1 is shown as a separate resistor **90*a* and a separate capacitor 90*b*** in FIGURE 2.

The operation of the circuit, with the exception of the synchronizing mechanism, is substantially identical to that described in connection with FIGURE 1. Briefly, a positive going vertical synchronizing signal, applied to the anode of the diode 102, causes conduction of the discharge tube 36 and the diode 102 discharging the charging capacitor 75 and providing a positive pulse at the anode 66 of the output tube 54. The positive pulse is coupled back to the control grid 80 of the discharge tube, and, in the manner explained in connection with FIGURE 1, causes charging of the capacitor 92 to cut off the discharge tube 36 and begin the charging circuit anew. The feedback pulse from the secondary winding 72 is fed through the coupling capacitor 48 through the control grid 52 of the output 54 and provides the same action as the feedback pulse described in connection with FIGURE 1.

The circuit values shown in FIGURE 2 provide an efficient vertical deflection circuit with acceptably short retrace time.

What is claimed is:

1. In a television receiver having a cathode ray image reproducing tube and an electromagnetic deflection yoke for said tube including vertical deflection windings, and further having a source of vertical synchronizing signals, a vertical deflection circuit comprising in combination:
   - a charging capacitor;
   - charging circuit means for said charging capacitor including a source of direct voltage;
   - discharge circuit means for said charging capacitor including a first electron tube across said charging capacitor;
   - a second electron tube having an input electrode and an output electrode;
   - means for applying the voltage across said charging capacitor to the input electrode of said second tube;
   - transformer means for connecting the output electrode of said second tube to the vertical deflection windings, including a primary winding connected to said ouput electrode and a secondary winding connected to said vertical deflection windings;
   - first feedback means of a first polarity connected between the output electrode of said second tube and said first tube to cause self-oscillations in said circuit to sequentially charge said charging capacitor through said charging circuit means and to discharge said charging capacitor through said discharge circuit means;
   - second feedback means of a second polarity opposite to said first polarity for applying signals from said secondary winding of said transformer means to the input electrode of said second tube;
   - and means for applying signals from said source of vertical synchronizing signals to said deflection circuit to initiate the discharge of said charging capacitor and synchronize said self-oscillations with the vertical synchronizing signals.

2. In a television receiver having a cathode ray image reproducing tube and an electromagnetic deflection yoke for said tube including vertical deflection windings, a vertical deflection circuit comprising in combination:
   - a charging capacitor;
   - charging circuit means for said charging capacitor including a source of direct voltage connected to said charging capacitor;
   - discharge circuit means for said charging capacitor including a first electron tube, having at least a control grid, connected across said charging capacitor;
   - a second electron tube having an input electrode and an output electrode;
   - means for applying the voltage across said charging capacitor to the input electrode of said second tube;
   - transformer means for connecting the output electrode of said second tube to the vertical deflection windings including a primary winding connected to said output electrode and a secondary winding connected to said vertical deflection winding;
   - first feedback means for applying positive-going voltage pulses from the output electrode of said second tube to the control grid of said first tube to cause self-oscillations in said circuit to sequentially charge said charging capacitor through said charging circuit and discharge said charging capacitor through said discharge circuit;
   - and further feedback means for applying negative-going voltage pulses occurring during vertical retrace time from said secondary winding of said transformer means to the input electrode of said second tube.

3. In a television receiver having a cathode ray image reproducing tube and an electromagnetic deflection yoke for said tube including vertical deflection windings, and further having a source of vertical synchronizing signals, a vertical deflection circuit comprising in combination:
   - a charging capacitor;
   - charging circuit means for said charging capacitor including a source of direct voltage and a peaking resistor connected in series with said charging capacitor;
   - discharge circuit means for said charging capacitor including a first electron tube having a cathode, anode, and control grid and having the anode to cathode path of said tube connected across the series combination of said charging capacitor and said peaking resistor;
   - a second electron tube having an input electrode and an output electrode;
   - means for applying the voltage across the series combination of said charging capacitor and said peaking resistor to the input electrode of said second tube;
   - transformer means for connecting the output electrode of said second tube to the vertical deflection windings, including a primary winding connected to said output electrode and a secondary winding connected to said vertical deflection winding;
   - first feedback means connected between the output electrode of said second tube and the control grid of said first tube to cause self-oscillation in said circuit to sequentially charge said charging capacitor through said charging circuit means and to discharge said charging capacitor through said discharge circuit means;
   - second feedback means for applying signals from said secondary winding of said transformer means through said peaking resistor and said charging capacitor to the input electrode of said second tube;
   - and means for applying signals from said source of vertical synchronizing signals to said deflection circuit to initiate the discharge of said charging capacitor and synchronize said self-oscillations with said vertical synchronizing signals.

4. In a television receiver having a cathode ray image reproducing tube and an electromagnetic deflection yoke for said tube including vertical deflection windings, and further having a source of vertical synchronizing signals, a vertical deflection circuit comprising in combination:

a charging capacitor;

a charging circuit for said charging capacitor including a source of direct voltage and a peaking resistor connected in series with said charging capacitor;

a discharge circuit for said charging capacitor including a first electron tube having a cathode, anode, and control grid connected across the series combination of said charging capacitor and said peaking resistor;

a second electron tube having an input electrode and an output electrode;

means for applying the voltage across the series combination of said charging capacitor and said peaking resistor to the input electrode of said second tube;

transformer means for connecting the output electrode of said second tube to the vertical deflection windings including a primary winding connected to said output electrode and a secondary winding connected to said vertical deflection winding;

first feedback means connected between the output electrode of said second tube and the control grid of said first tube to cause self-oscillations in said circuit to sequentially charge said charging capacitor through said charging circuit and discharge said charging capacitor through said discharge circuit;

second feedback means for applying voltage pulses occurring during vertical retrace time from said secondary winding of said transformer means through said peaking resistor and said charging capacitor to the input electrode of said second tube;

and means for applying signals from said source of synchronizing signals to said deflection circuit to initiate the discharge of said charging capacitor and synchronize said self-oscillations with the vertical synchronizing signals.

References Cited by the Examiner

UNITED STATES PATENTS

| | | | |
|---|---|---|---|
| 2,284,378 | 5/42 | Dome | 315—27 |
| 2,729,766 | 1/56 | Vilkomerson | 315—27 |
| 2,795,733 | 6/57 | Vilkomerson | 315—27 |

DAVID G. REDINBAUGH, *Primary Examiner.*

ROY LAKE, *Examiner.*